(12) United States Patent  
Griffin et al.

(10) Patent No.: US 7,456,759 B2
(45) Date of Patent: Nov. 25, 2008

(54) KEYBOARD INTEGRATED NAVIGATION PAD

(75) Inventors: Jason T. Griffin, Kitchener (CA); Steven H. Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 590 days.

(21) Appl. No.: 11/164,807

(22) Filed: Dec. 6, 2005

(65) Prior Publication Data

US 2007/0126702 A1 Jun. 7, 2007

(51) Int. Cl.
*H03M 11/00* (2006.01)
(52) U.S. Cl. .................... 341/22; 400/485; 341/20; 379/433.06; 345/157; 345/161
(58) Field of Classification Search ............ 341/20, 341/22, 173, 176, 23; 345/168, 157, 160, 345/161; 379/433.06, 433.07; 400/485
See application file for complete search history.

(56) References Cited

U.S. PATENT DOCUMENTS 4,680,577 A * 7/1987 Straayer et al. ............ 345/160
5,521,590 A * 5/1996 Hanaoka et al. .......... 340/10.51
5,889,507 A * 3/1999 Engle et al. ................. 345/161
5,914,702 A * 6/1999 Derocher et al. ............ 345/157
6,810,271 B1 10/2004 Wood et al.
2003/0094354 A1 5/2003 Badarneh
2005/0053225 A1 3/2005 Griffin

OTHER PUBLICATIONS

European Search Report, Jan. 18, 2006.

* cited by examiner

*Primary Examiner*—Albert K Wong
(74) *Attorney, Agent, or Firm*—Novak Druce + Quigg, LLP

(57) ABSTRACT

A key arrangement that includes a plurality of keys arranged in a pattern including a first column, a last column, and one or more middle columns. At least one of the middle columns includes a multidirectional navigational key. The first and last columns have keys in each row. A plurality of the keys and the multidirectional navigational input key have alphanumeric indicia. The multidirectional navigational input key may be integrated with the keys in a reduced QWERTY, QWERTY, QWERTZ, AZERTY, or DVORAK layout and may additionally be integrated with the keys in a telephony pad numeric layout. A touchpad or rotatable rim may also be disposed about the multidirectional navigational input key.

28 Claims, 8 Drawing Sheets

KEYBOARD INTEGRATED NAVIGATION PAD

FIELD

This technology relates to a key arrangement for a keyboard of an electronic device. In particular, the technology concerns a key arrangement for a handheld mobile communication device.

BACKGROUND

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize all of the keyboard surface as efficiently as possible.

Many keyboards on mobile devices have an input device for navigation through the graphical user interface, for example, a device, such as a trackball or rotating wheel, that operates to move a cursor or pointer or scrolls up and down a page. This navigation device often occupies a relatively large amount of space on the mobile device, because it is repeatedly used, and finer control is sometimes required to accomplish navigation than to simply press a key. To accommodate a larger, more convenient navigation device on the housing of a mobile device, the amount of space that is available for the keys of the keyboard or other input devices must be reduced. Therefore, a user must sacrifice larger keys for a conveniently sized navigation device, or vice-versa.

Another keyboard spacing problem is that of finger overlap when keys are smaller than the user's finger and are spaced closely together. Because keys near the center of the keyboard are surrounded by other keys, they are particularly more difficult to press without the user's finger overlapping and inadvertently pressing an adjacent key.

BRIEF DESCRIPTION OF THE DRAWING FIGURES

DETAILED DESCRIPTION

The key arrangements and mobile devices described herein are examples of a conveniently sized multidirectional navigational input key that is integrated with an alphanumeric key layout. The example multidirectional navigational input keys can be used in a navigation mode to move, for example, a cursor or a scroll bar. In an alphabetic or numeric mode, it can be used to enter numbers or letters. This dual feature allows for fewer and larger keys to be disposed on the keyboard while providing for a QWERTY, reduced QWERTY, QWERTZ, DVORAK, or AZERTY key layout and navigational input. These familiar keyboard layouts allow users to type more intuitively and quickly than, for example, on the standard alphabetic layout on a telephone pad. By utilizing fewer keys, the keys can be made larger and therefore more convenient to the user.

In some examples, keys in the middle columns are larger than keys in the outer columns to prevent finger overlap on the interior keys. As used herein, middle columns are all columns that are not on the outside left and right sides. The term "middle column" is not limited to the center column. It is easier for a user to press keys on the outer columns without their finger overlapping an adjacent key. This is because part of the user's thumb or finger can overlap the outside housing of the device, rather than other keys. Therefore, these outer column keys can be made smaller. The multidirectional navigational input device is provided in the center of the keypad and has a larger surface than the outside keys. The larger surface in the inner part of the keyboard helps prevent finger overlap.

In another example, a touchpad or rotatable rim is disposed about the periphery of the example multidirectional navigational input key. The rim or touchpad can be used as a secondary navigational device that acts in conjunction with the multidirectional navigational key. For example, the rim or touchpad could provide a third dimension of navigational input (with the multidirectional navigational input key providing first and second dimensions). The rim or touchpad can also function as a stand-alone, one or two dimensional, navigational input device.

Figure 5:
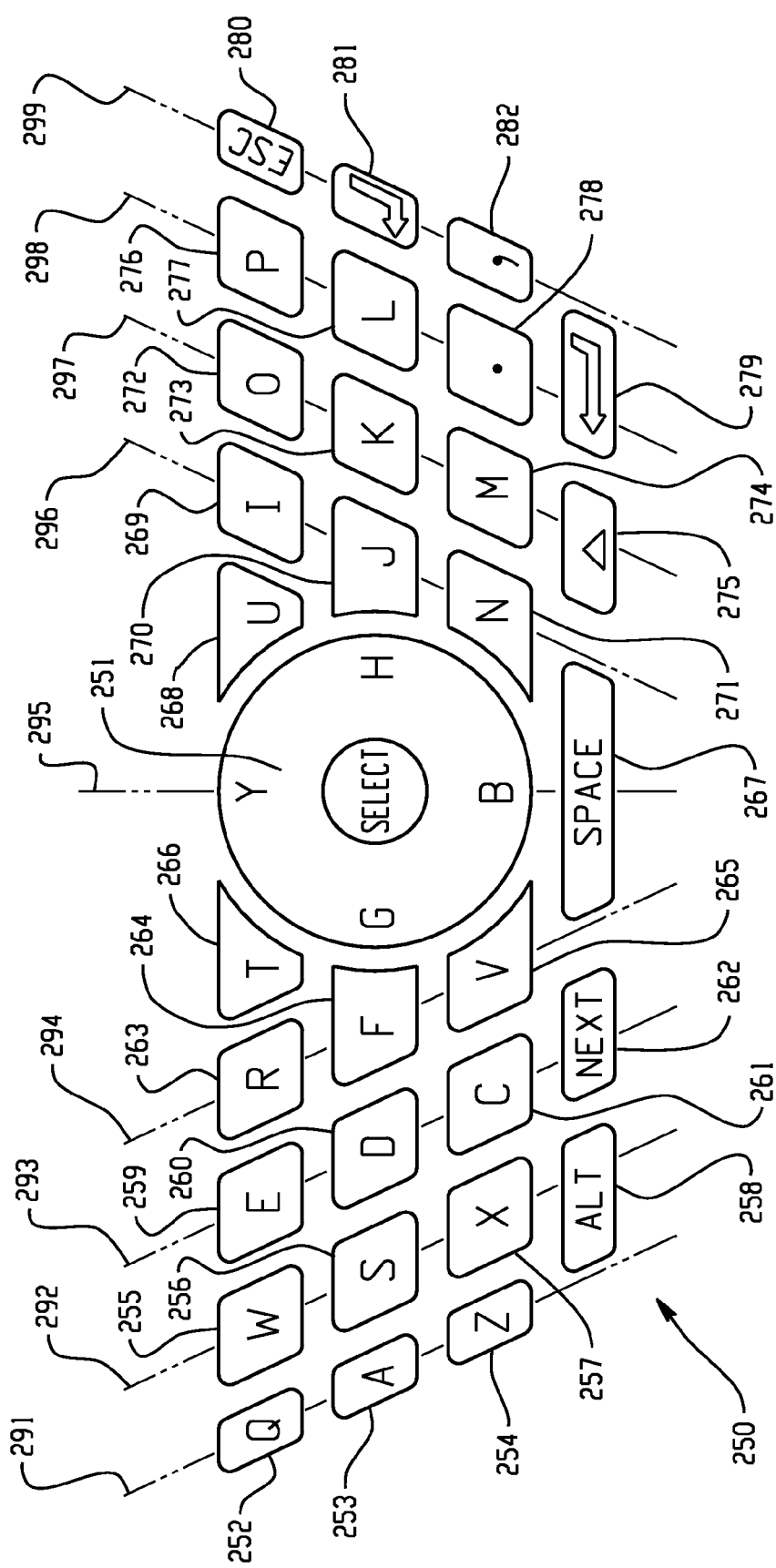
FIG. 5 is a front facing view of a fifth example key arrangement.

The example key arrangements described herein, with the exception of the example of FIG. 5, have more than one letter on some keys. To determine which letter should be entered, predictive text software can be utilized in conjunction with these key arrangements. Accordingly, the example electronic devices may include a predictive text computer program that is used in conjunction with the keyboard. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys. An example predictive text computer program is described in the following co-owned patent applications, which are incorporated herein by reference in their entirety: "Customizable Predictive Text Method For Reduced Keyboards," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keyboard", International Patent Application No. PCT/CA02/00862, filed Jun. 10, 2002.

Alternatively, the user can manually determine which letter is desired by quickly tapping the key two or three times. For example, for a key that is labeled "QW" a Q would be entered on the first tap, but the user could manually select a W to be entered by quickly tapping the same key again. The manual select and predictive text methods can both be enabled on the device and the desired mode can be selected by the user.

Figure 6:
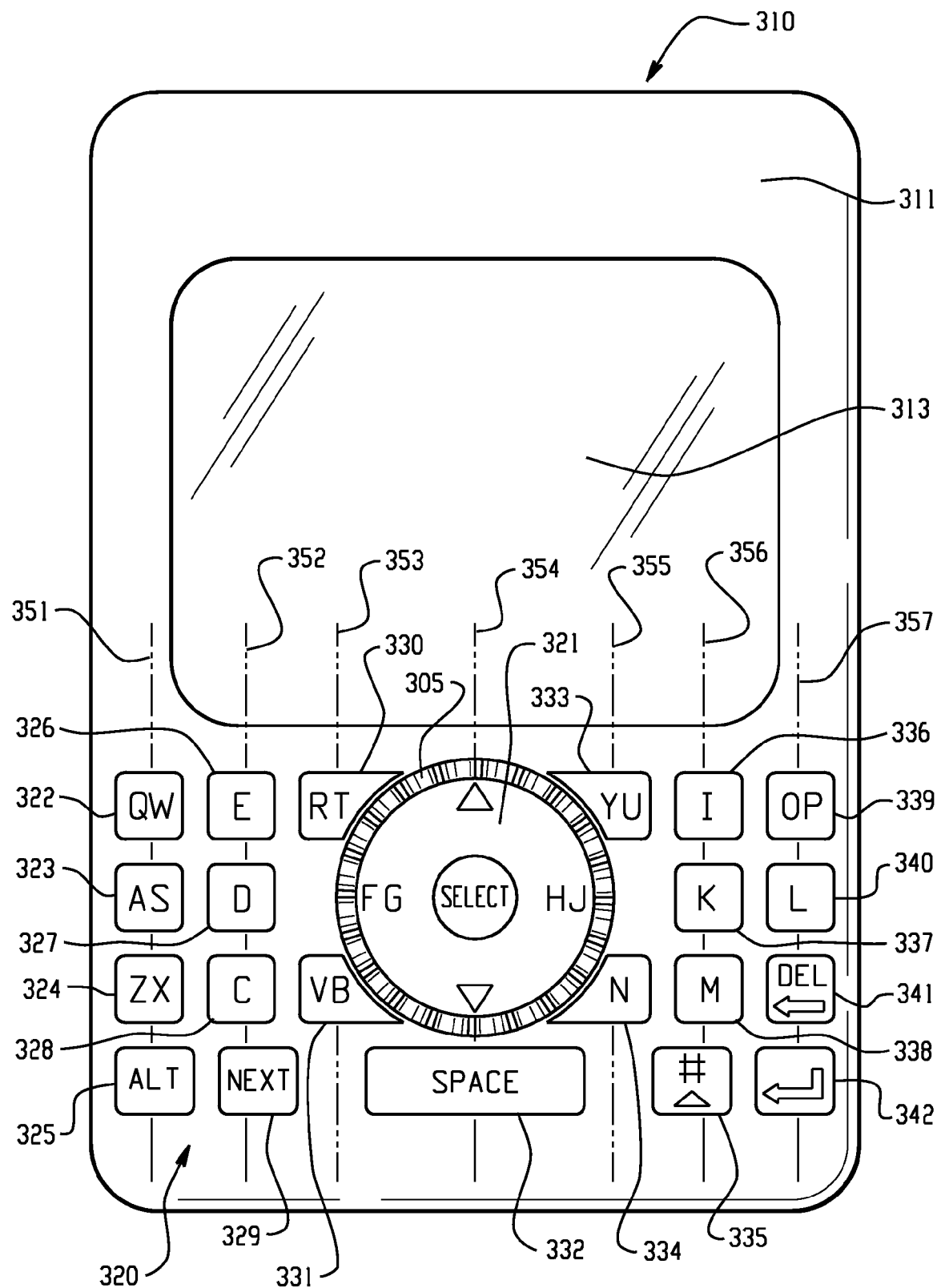
FIG. 6 is a front facing view of a fifth example mobile device having a sixth example key arrangement.

With reference now to the drawings, FIGS. 1-7 depict numerous key arrangements for a keyboard. FIGS. 1-4, and 7 depict an example key arrangement on a mobile communication device while FIGS. 5 and 6 depict example key arrangements. Any of the key arrangements may be utilized on any kind of input device, the example key arrangements not being limited to a particular application. Examples of mobile communication devices that may derive a benefit from the example key arrangement include mobile stations, cellular telephones, wireless personal digital assistants (PDAs), two-way paging devices, and others. In addition, the example key arrangement may be utilized on conventional telephones, calculators, and other devices having keyboards or keypads.

Figure 1:
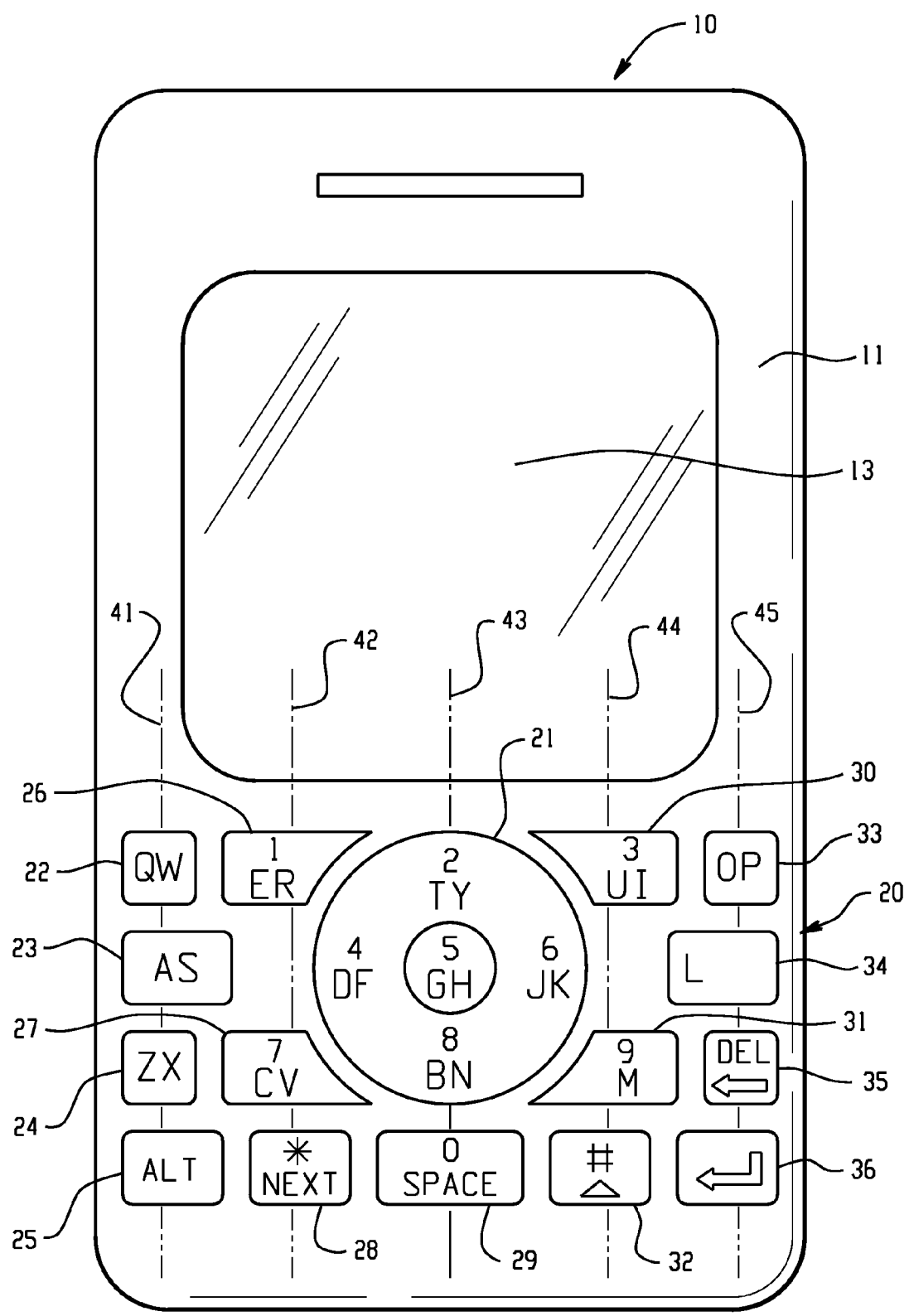
FIG. 1 is a front facing view of a first example mobile device having a first example key arrangement.

FIG. 1 depicts the front face of a first example mobile device 10 with a first example key arrangement 20. The mobile device 10 also includes a housing 11 and a display screen 13. The keys 21-36 are arranged in five columns 41-45 and four rows. The first and last columns 41, 45 have keys in each row. The second and fourth columns 42, 44, which are middle columns, have keys in three rows, with no keys present in the second row where the multidirectional navigational input key 21 has its greatest width. The keys in the second and fourth columns 42, 44 are chamfered or have an arcuate concavity on the side facing the multidirectional navigational input key 21 so that they can be located closely to the circular multidirectional navigational input key 21 and have a maximized key size. The center column 43, which is also a middle column, includes the multidirectional navigational input key 21, and a space bar 29 centered beneath it.

The alphabetic key layout is of a reduced column QWERTY type and is overlaid on the keys 21-24, 26-27, 30-31, and 33-34. The multidirectional navigational input key 21 is integrated into the layout. In this example, the upper, left, center, right, and lower areas of the multidirectional navigational input key 21 are labeled respectively with the alphabetic indicia "TY," "DF," "CGH," "JK," and "BN." The remaining keys 25, 28, 32, 35, 36 have various functions, such as "alt," "cap," "next," "delete," and "enter."

A numeric phone pad key layout is also overlaid on the three middle columns 42-44. Numbers "2," "4," "5," "6," and "8" are disposed, respectively, on the upper, left, center, right, and lower areas of the multidirectional navigational input key 21. The remaining numbers ("1," "3," "7," and "9") and symbols (# and *) are disposed on the other keys 26-32 of the middle columns 42-44 in a manner consistent with the telephony keypad layout.

One of the keys, such as the "alt" key 25 in the bottom row of the first column 41 can be used to toggle between navigation, alphabetic, and numeric entry modes. In a navigation mode, the multidirectional navigational input key 21 is operable to move a cursor or scroll bar in a graphical user interface display on the display screen 13. For example, pressing on a right side of the multidirectional navigational input key 21 will move a cursor to the right, and pressing on the bottom portion of the multidirectional navigational input key 21 will move the cursor down. The center portion of the multidirectional navigational input key 21 is a select key in this mode. Pressing the center area of the multidirectional navigational input key 20 triggers a selection. This is similar to a mouse "click." In alphabetic mode, the multidirectional navigational input key 21 is operable to input the alphabetic characters that are indicated on each area. For example, pressing the left side surface of the multidirectional navigational input key 21 will enter the character "D" or "F" depending on the predictive text recognition or manual selection.

Figure 2:
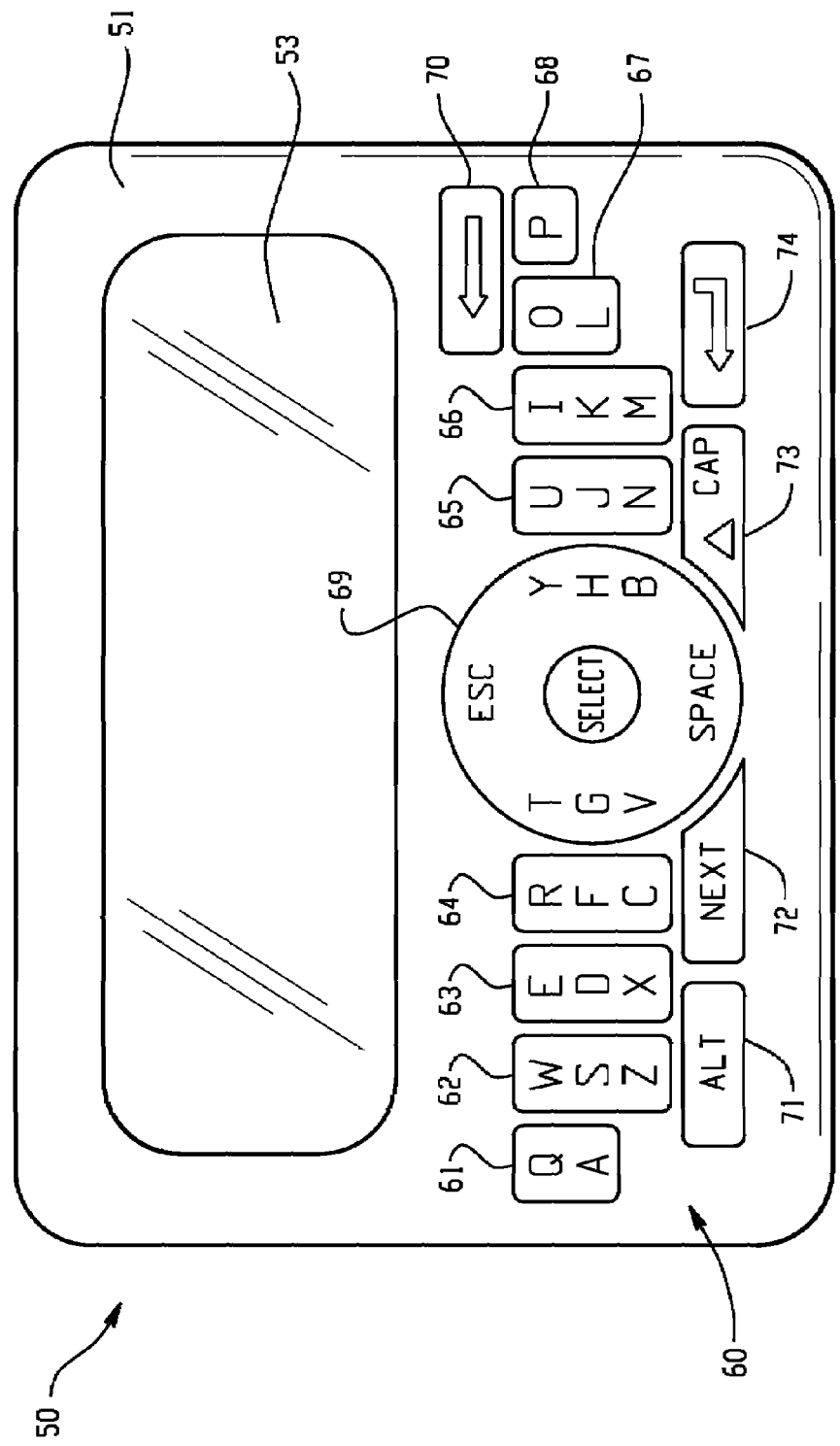
FIG. 2 is a front facing view of a second example mobile device having a second example key arrangement.

FIG. 2 depicts the front face of a second example mobile device 50 with a second example key arrangement 60. The mobile device 50 also has a housing 51 and a display screen 53. The multidirectional navigational input key 69 is located approximately in the middle of keys 61-64 (on the left side) and 65-68 (on the right side). Other keys 70-74 are also located on the front of the housing 51 on a bottom row beneath the keys 61-68. Keys 72 and 73 have a chamfered corner or an arcuate concavity on the side facing the multidirectional navigational input key 69 so that they will fit closer to the circular multidirectional navigational input key 69. Key 70 is located above the keys 67 and 68.

The alphabetic key layout is of a reduced-row QWERTY type and is overlaid on the keys 61-69. Two sides of the multidirectional navigational input key 69 are integrated into the reduced-row QWERTY layout. Each key 61-64 and 65-68 and the left and right sides of the multidirectional navigational input key 69 are associated with one of the ten columns of letters in a QWERTY keyboard layout. Starting with key 61, which is associated with the letters "QA," keys 61-64 are successively associated with the next column of the QWERTY keyboard. The left side of the multidirectional navigational input key 69 is associated with the letters "TGV" and the right side of the multidirectional navigational input key 69 is associated with the keys "YHB." Keys 65-68 are also successively associated with the remaining columns of the QWERTY keyboard. Keys 61 and 67 are only associated with two letters each, and key 68 is only associated with one letter. Accordingly, these keys are shorter in height than the other keys that have three letters associated with them. This shortened height provides at least two benefits: (1) a user may more easily select the keys labeled 62, 66, and 67, without accidentally depressing an unwanted key, because part of these keys have an adjacent space that is not occupied by another key; and (2) because these keys 61, 67, and 68 have a different shape from the other alphabetic entry keys 62-66, they may be more easily discernable by touch.

The multidirectional navigational input key 69 also has other areas that are utilized in alphabetic mode. The bottom portion is associated with a space bar function; the top function is associated with an "escape" function; and the center portion is associated with a select function. The center area of the multidirectional navigational input key 69 is labeled "SELECT," to denote that it has select function as described above. The remaining keys 70-75 have various functions, such as "alt," "next," "delete," and "enter." The multidirectional navigational input key 69 operates in an alphabetic and navigational mode as described above.

Figure 3:
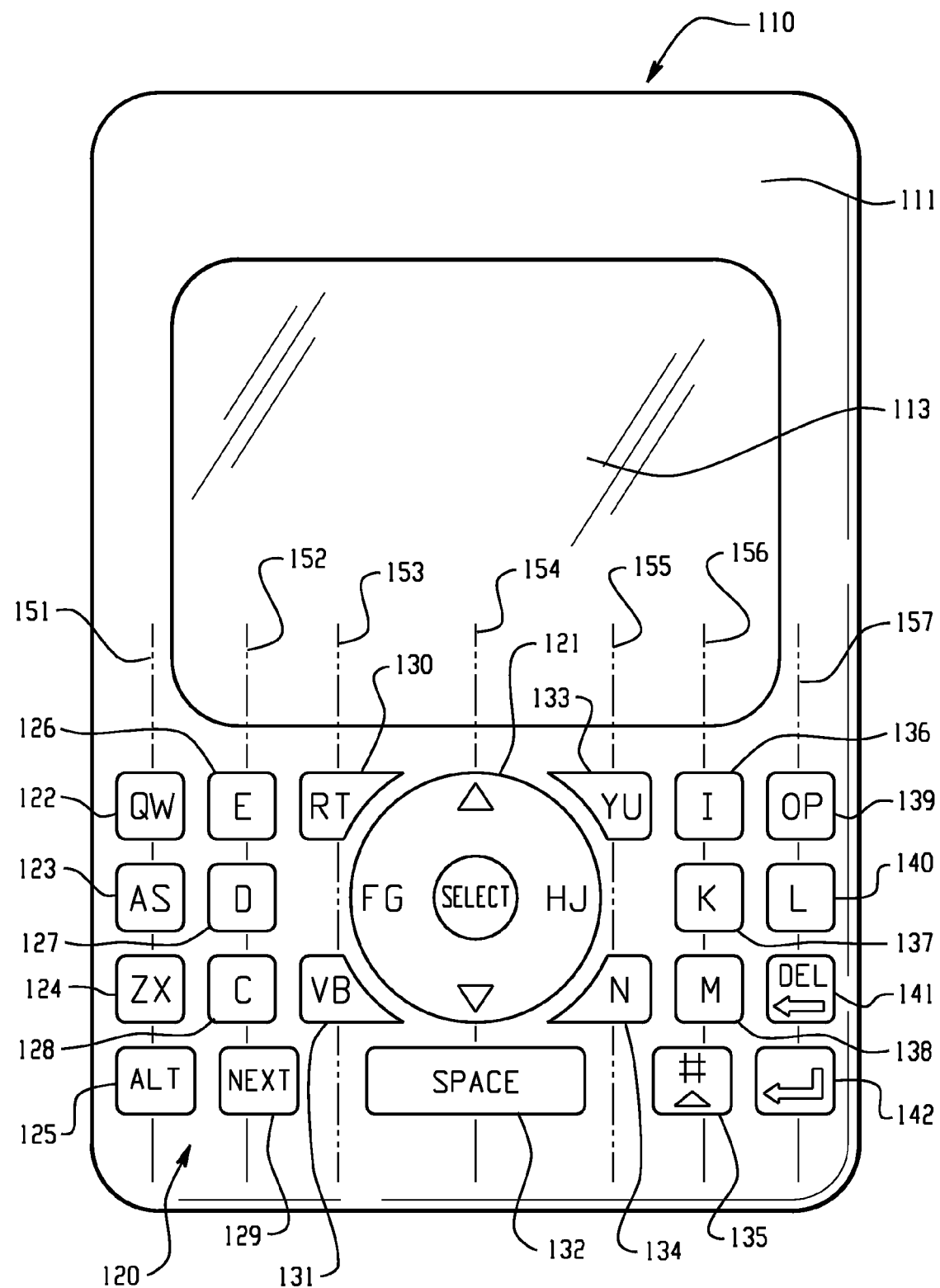
FIG. 3 is a front facing view of a third example mobile device having a third example key arrangement.

FIG. 3 depicts a third example mobile device 110 that is similar to the first example mobile device 10 and key arrangement 20 of FIG. 1. The third example mobile device 110 differs in that the housing 111 is wider and the key arrangement 120 has two additional middle columns 152 and 156 that each contain three additional keys 126-128 and 136-138. The key layout is still a reduced column QWERTY keyboard but is different in that fewer keys have two letters and more keys have single letters. This example key arrangement 120 requires more space than the first example key arrangement 20, but provides more keys that are devoted to a single letter. This increases the performance of the alphabetic input through the predictive text system, or, alternatively, decreases the number of times a user would have to manually press a key twice to input the second associated key, depending on which mode the device is in.

The multidirectional navigational input key 121 in the third example device 110 only uses the left and right side portions for text entry. The top and bottom portions are used only for up and down navigational input in both modes. This allows the user to be able to navigate a cursor up and down or scroll up and down in a graphical user interface while remaining in the alphabetic entry mode. This example key arrangement 120 could be used in conjunction with another one-dimensional input device, e.g. a thumbwheel, to obtain two dimensional cursor movement while in the alphabetic entry mode.

Figure 4:
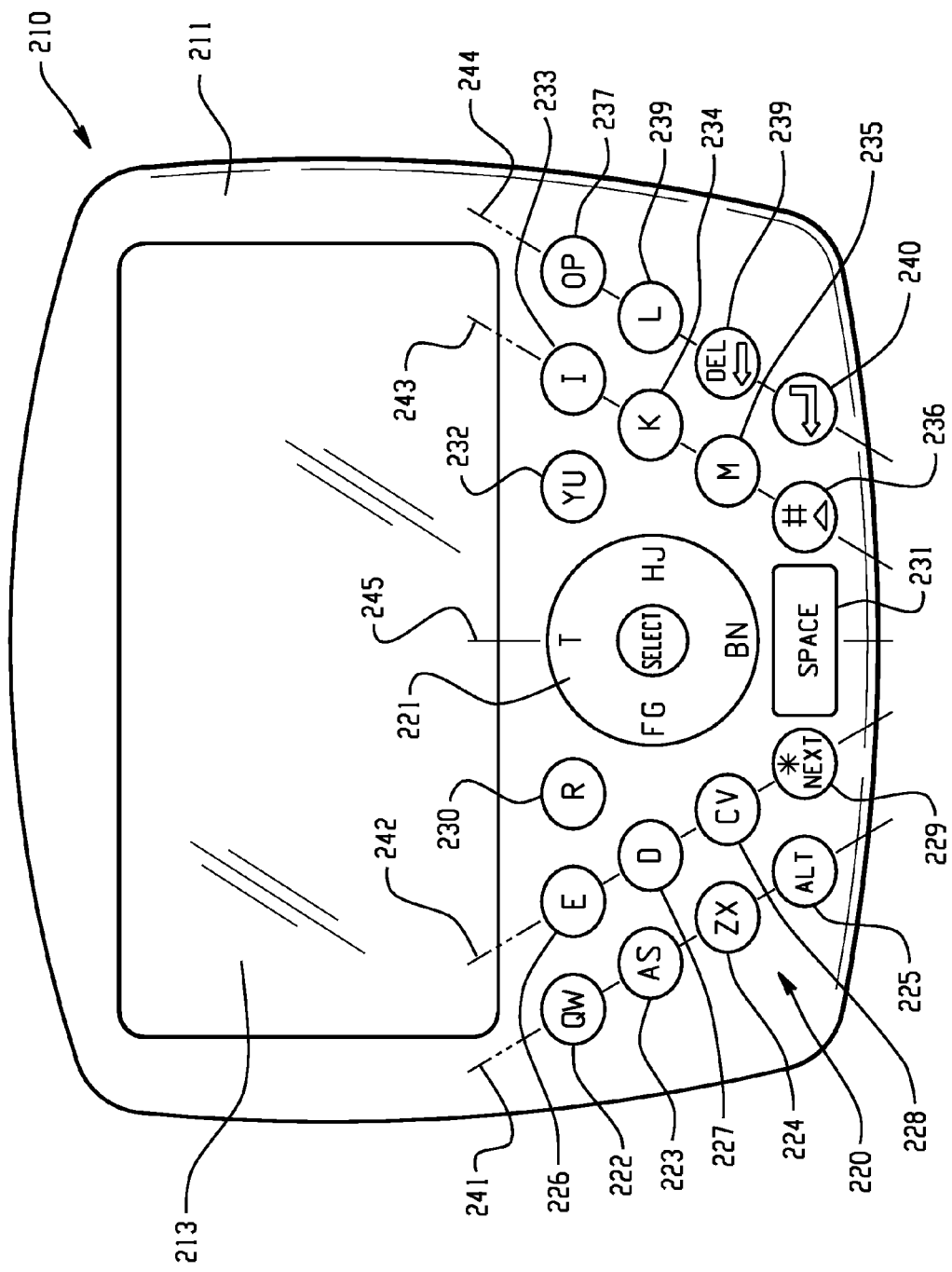
FIG. 4 is a front facing view of a fourth example mobile device having a fourth example key arrangement.

FIG. 4 depicts a fourth example mobile device 210 with a fourth key arrangement 220. The multidirectional navigational key 221 is situated in the center column 245 between two columns on each side 241-242, 243-244, and an extra key in the first row from the top on each side 230, 232. The four columns located to the left and right sides of the multidirectional navigational key 221 angle inwardly toward the bottom of the middle column 245. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. The keys in the first and last columns 241, 244 are positioned near the sides of the housing face 211. The angled inward design simulates that of a standard QWERTY keyboard, thereby enhancing user familiarity with the keyboard. It also provides a better ergonomic positioning for the thumbs to access the keys, as it is generally more difficult for a user to reach the lower corners of a key arrangement that is on a hand-held device and is thumb activated. All the keys 222-240 are round except for the space bar 231.

The alphabetic key layout is a reduced column QWERTY type and is overlaid on the keys 221-224, 226-228, 230, 232-235, 237, and 238. The multidirectional navigational input key 221 is integrated into the layout. In this example, the upper, left, right, and lower areas of the multidirectional navigational input key 221 are respectively labeled with the alphabetic indicia "T," "FG," "HJ," and "BN." The center area of the multidirectional navigational input key 221 is labeled "SELECT," to denote that it has the select function as described above. A space bar 23 is centered underneath the multidirectional navigational input key 221 in the middle column 245. The remaining keys 225, 229, 236, 239, 240 have various functions, such as "alt," "next," "delete," and "enter." The multidirectional navigational input key 221 operates in an alphabetic and navigational mode as described above.

FIG. 5 depicts a fifth example key arrangement 250 that is overlaid with a modified full-QWERTY layout. The layout is a full QWERTY because there is a separate key or surface of a key for each letter of the alphabet. In the fifth example key arrangement 250, there are nine columns 291-299 with two or more keys, and two extra keys 266, 268 in the upper row to the left and right side of the multidirectional navigational input key 251. Twenty-three of these keys are used for alphabetic input 251-257, 259-261, 263-266, 268-274, 276-277. The multidirectional navigational input key 251 is approximately centered in the middle of the key arrangement 250. There are four key surfaces on the left, right, upper, and lower areas of the multidirectional navigational input key 251. These surfaces may be indentations, protrusions, or flat. This brings the total number of keys or key surfaces that are used for alphabetic input to twenty-six. A fifth key surface is also present in the center of the multidirectional navigational input key 251, and is used for a select function in this example. The six keys 264, 265, 266, 268, 270, 271 to the left and right of the multidirectional navigational input key 251 are chamfered or have an arcuate concavity on the side facing the multidirectional navigational input key 251 so that they can be located closely to the circular multidirectional navigational input key 251 and maximize key size.

The keys in the first and last columns 291, 299 are positioned near the left and right side of the key arrangement 250. The first and last columns 291, 299 have keys that are smaller in width than the keys in the middle columns 292-298 and the two extra keys 266, 268. This key arrangement 250 is designed so that the first and last columns 291, 299 of the key arrangement 250 are positioned near the sides of a device, such that the user's thumbs or fingers will more easily contact the smaller peripheral keys. Because the outer column keys are smaller, the keys in the middle columns 292-298 may be made larger. This is particularly beneficial for a keyboard for a device with size constraints. The eight columns located to the left and right sides of the multidirectional navigational key 251 angle inwardly toward the bottom of the middle column 251. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. This provides the same benefit discussed above in the description of FIG. 4.

The alphabetic key layout is of a full QWERTY type and is overlaid on the keys 251-257, 259-261, 263-266, 268-274, 276-277. The multidirectional navigational input key 251 is integrated into the layout. In this example, the upper, left, right, and lower areas of the multidirectional navigational input key 251 are respectively labeled with the alphabetic indicia "Y," "G," "H," and "B." The center area of the multidirectional navigational input key 251 is labeled "SELECT," to denote that it has a select function as described above. A space bar 267 is centered underneath the multidirectional navigational input key 251 in the center column 295. The remaining keys 258, 262, 278-282 have various functions, such as "alt," "next," "delete," and "enter." The multidirectional navigational input key 251 operates in an alphabetic and navigational mode as described above.

FIG. 6 depicts a sixth example mobile device 310 having a sixth example key arrangement 320. The key arrangement 320 and reduced column QWERTY layout are similar to that of the third example mobile device 110 and key arrangement 120 depicted in FIG. 3. However, the sixth example mobile device and key arrangement has a raised rotatable rim 305 disposed about the periphery of the multidirectional navigational input key 321. The surface of the rim 305 is enhanced to provide a gripping surface for a thumb or finger. In this example there are indentations spaced periodically about the rim. Other examples may instead have protrusions or a rubbery surface to better enable the user's thumb or finger to grip the rim and rotate it. Other gripping surfaces are also possible. The rim 305 can freely rotate in 360 degrees, and in some examples it can be depressible. The rim 305 may be coupled to the multidirectional navigational input key 321 or may instead be coupled to the housing 311. The rim 305 can be rotatable independently of the multidirectional navigational input key 321. The rim 305 can be very thin to minimize the space it occupies on the face of the housing 311, or it can be thicker to provide an optimal gripping surface.

The rotatable rim 305 functions as either a stand-alone, two-dimensional input device, a stand-alone, single-dimensional input device, or a supplemental device for inputting a third navigational input. The user can select which way they want the rim 305 to function or it can be factory preset to only one mode.

As a stand-alone navigation device, the rim 305 is operable to input one- or two-dimensional navigation signals to the processor. For example, in a single-dimension mode, rotating the rim 305 moves a cursor or scroll bar up or down in a graphical user interface. For example, rotating the rim 305 in the clockwise direction would scroll the page down, and rotating it counter-clockwise would scroll the page up.

In a two-dimensional mode, pressing the rim 305 down at a certain location would move a cursor in the same direction on the graphical user interface. Stated another way, pressing the rotatable rim at a location relative to the center of the rim causes a corresponding navigational input relative to the center of the graphical user interface. For example, pressing the rim 305 on the left side would move the cursor left. The rim 305 could be rotated while pressed down to a different location and the cursor would change its movement accordingly. For example, if while pressing down on the rim 305, the user rotates the rim 305 from the left side to the upper side of the rim 305, this would cause the cursor to go from moving left, to diagonally left and up, to straight up on the graphical user interface. This operational mode could also be used to control one or two scroll bars, among other navigational devices.

The rotatable rim 305 could also be used in conjunction with the multidirectional navigational input key 321 to provide a third navigation dimension. For example, the rim 305 could operate to move a scroll bar, like a finger-wheel on a mouse. Rotating the rim 305 counter-clockwise would move the scroll bar up, and rotating the rim 305 clockwise would move the scroll bar down, or vice-versa. Other applications running on an electronic device with a graphical user interface could also benefit from using the rim 305 to navigate in a third-dimension. For example, the rotatable rim 305 could beneficially provide a third dimensional input in a three-dimensional graph or game.

Figure 7:
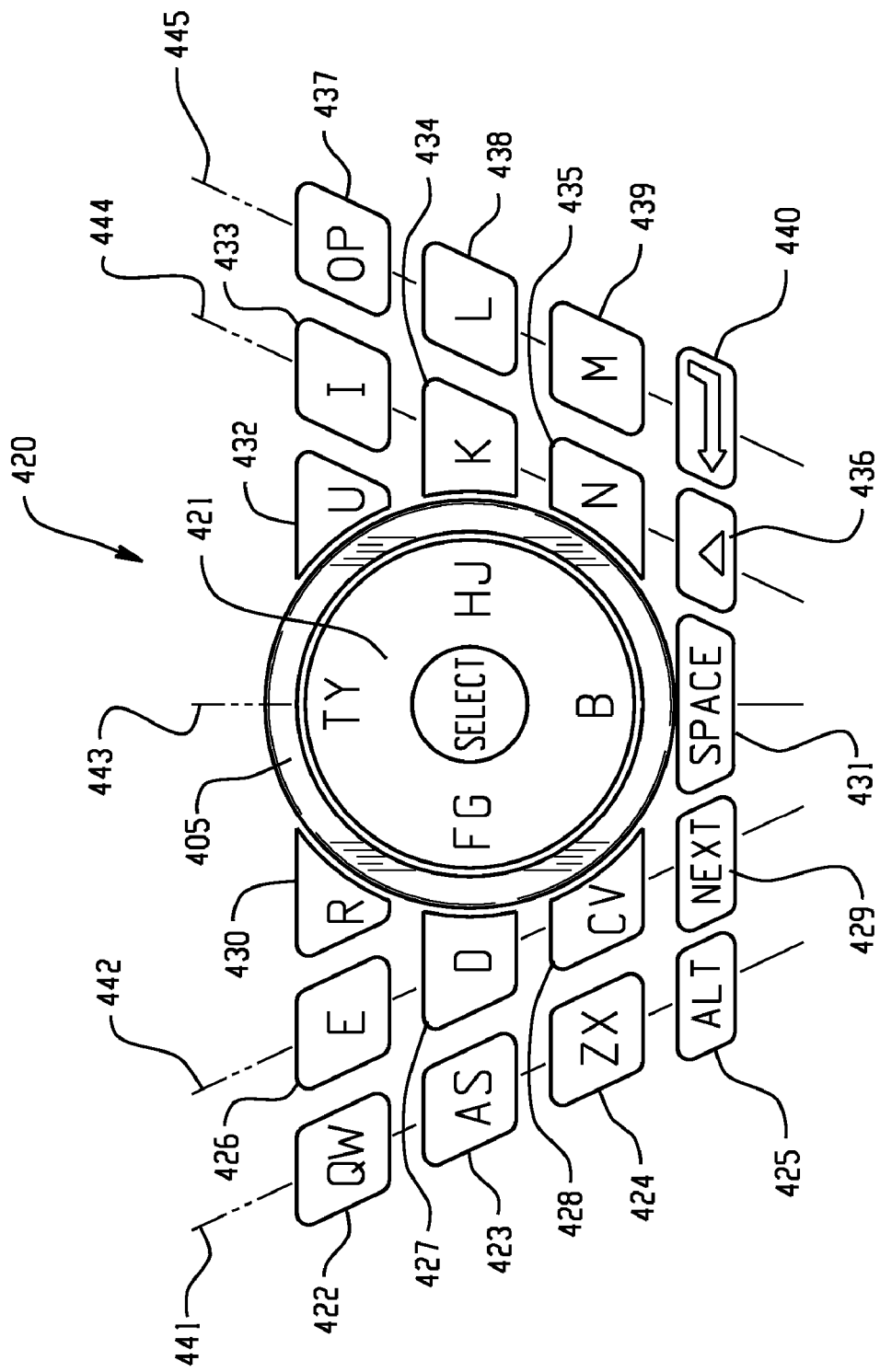
FIG. 7 is a front facing view of a seventh example key arrangement.

FIG. 7 depicts a seventh example key arrangement 420 that is overlaid with a reduced column QWERTY layout. There are four columns 441, 442, 444, and 445 with four keys, a center column with the multidirectional navigational input key 421 and space bar 431, and two extra keys 430, 432 in the upper row to the left and right side of the multidirectional navigational input key 421. The four columns 441, 442, 444, and 445 are angled toward the bottom part of the center column 443. Stated another way, the columns on the left side are diagonally oriented so that the keys in each row are further to the left than the keys in lower rows in the same column, and the columns on the right side are diagonally oriented so that the keys in each row are further to the right than the keys in lower rows in the same column. This angled arrangement imparts the benefits described above in reference to the key arrangement 220 of FIG. 4.

The keys in the middle columns 442-444 and the extra keys 430, 432 are also larger in total front surface area than the keys in the outer columns 441, 445. This imparts the benefits described above in reference to the key arrangement 250 of FIG. 5. The six keys surrounding the multidirectional navigational input key 421 have an arcuate concavity on the side facing the multidirectional navigational input key 421 so that they can be located closely to the circular multidirectional navigational input key 421 and maximize key size. A circular touchpad 405 is disposed around the periphery of the multidirectional navigational input key 421 and is described in detail below.

A reduced column QWERTY layout is overlaid on the example key arrangement 420. The multidirectional navigational input key 421 is integrated into the QWERTY layout along with the other alphabetic entry keys 422-424, 426-428, 430, 432-435, 437-439. Three keys 422, 423, 424 are associated with two letters in the first column 441. One key 437 in the first row of the last column 445 is associated with two letters. The multidirectional navigational input key 421 has five labeled areas. The upper, left, right, and lower areas of the multidirectional navigational input key 421 are associated with the letters "TY," "FG," "HJ," and "B." A center area of the multidirectional navigational input key 421 is labeled "SELECT," to denote that it has the select function described above. The space bar 431 is centered beneath the multidirectional navigational input key 421. The remaining keys on the bottom row 425, 429, 436, 440 have various functions, such as "alt," "next," "delete," and "enter." The multidirectional navigational input key 421 operates in an alphabetic and navigational mode as described above.

In this example key arrangement 420, the circular touchpad 405 is disposed around the periphery of the multidirectional input key 421. When the example key arrangement 420 is employed in an electronic device, the touchpad 405 is configured to detected a finger touch on the touchpad 405, and correspondingly input a navigational signal to a processor to move a cursor, scroll bar, or some other navigational device on a graphical user interface. The circular touchpad 405 operates in much the same way as the rotatable rim 305 described above: it can be used as a stand-alone navigation device to provide single- or two-dimensional input to the processor, or it can be used in conjunction with the multidirectional navigational input key 421. A user can select which of these operational modes they desire the touchpad 405 to operate in, or it can be factory preset to operate in only one mode.

For an example of a single-dimensional input, the touchpad 405 may be configured to cause a cursor or scroll bar to move up and down a graphical user interface when a user brushes their finger or thumb across the touchpad 405.

In a two-dimensional mode, pressing the touchpad 405 at a certain location would move a cursor in the same direction on the graphical user interface. Stated another way, pressing the touchpad at a location relative to the center of the touchpad causes a corresponding navigational input relative to the center of the graphical user interface. For example, pressing the touchpad 405 on the left side would move the cursor left. The user could move their finger or thumb along the circular touchpad 405, and this would change the navigational movement accordingly. For example, if the user touches the touchpad 405 on the left side and moves their finger from the left side to the upper side of the touchpad 405, this would cause the cursor to go from moving left, to diagonally left and up, to straight up on the graphical user interface. This operational mode could also be used to control one or two scroll bars, among other navigational devices.

The touchpad 405 could also be used in conjunction with the multidirectional navigational input key 421 to provide a third dimension of navigation. For example, a brushing motion on the touchpad 405 could operate to move a scroll bar like a finger-wheel on a mouse. Brushing the touchpad 405 counter-clockwise would move the scroll bar up, and brushing the touchpad 405 clockwise would move the scroll bar down, or vice-versa. The multidirectional navigational input key 421 would, at the same time, be operable to move a cursor in two directions. Other applications running on an electronic device with a graphical user interface could also benefit from using the touchpad 405 for a third dimensional navigational input device, as explained above in the description of the rotatable rim 305.

Regarding all the example key arrangements, other keys could be added to these examples, or the function of the keys could be different. In addition to the letters, numbers, and symbols shown, the keys may further include symbols and functions that are typically utilized with keyboards. Example symbols include ".", ",", ";", "'", """, ":", "?", "/", ">", "<", "!", "@", "~", "$", "%", "^", "&", "(", ")", "*", "-", "+", "=", "[", "]", "{", "}", "|", and "\", among other known symbols. Example functions include "tab," "caps lock," "shift," "control," "alt," "return/enter," "backspace," "insert," "delete," "home," "end," "page up," "page down," "end," "escape,"

"pause," "break," "send," "end," "txt," "sym," and "scroll lock," among other known functions associated with text entry or telephony entry.

A variety of shapes are shown for the keys in the various embodiment. Other shapes may also be utilized, without limitation. In several of the example key arrangements, the keys in the first and last columns are shown as having a smaller size than the keys in the middle columns. In addition, for key arrangements that are positioned at the bottom of a mobile communication device, it may be desirable to have the keys in the bottom row have a smaller size than the keys in the upper rows. The keys in the bottom row are preferably positioned near the bottom edge of the face of the housing of the mobile communication device such that the same principals of usage apply and the keys are easier to access because of their proximity to the edge of the device. Alternatively, for a device where the keyboard is positioned at the top of the housing, the top row may have keys that are smaller in size than keys in the lower rows of the key arrangement.

Figure 8:
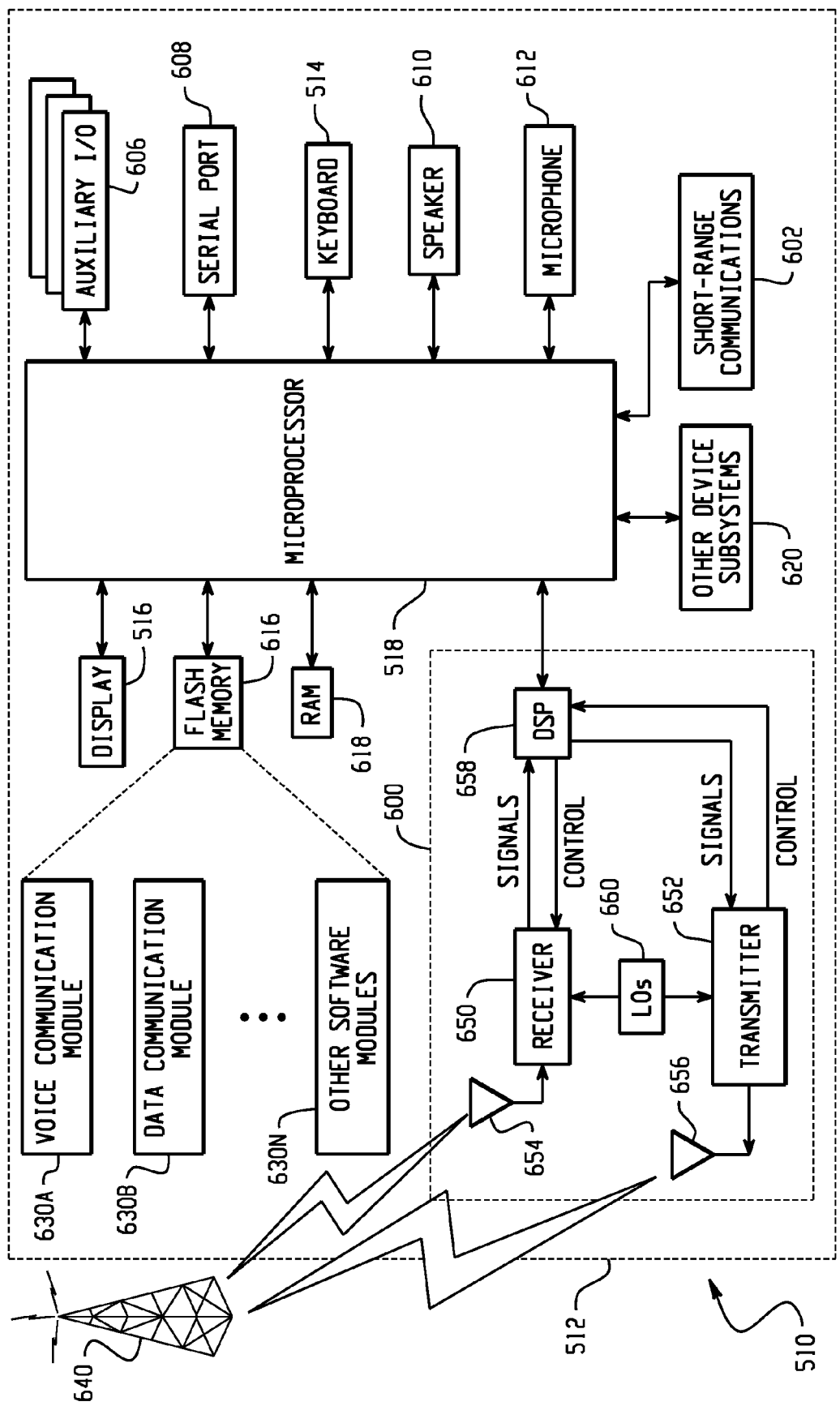
FIG. 8 is a block diagram illustrating an example mobile communication device.

The handheld mobile communication devices, presented in FIGS. 1, 2, 3, 4, and 6 include similar features, such as a housing, a keyboard, and an output device. These and other features are shown schematically in FIG. 8. The output device shown is a display 516, which is preferably a full graphic LCD. Other types of output devices may alternatively be utilized. A processing device 518, which is shown schematically in FIG. 8, is contained within the housing 512 and is coupled between the keyboard 514 and the display 516. The processing device 518 controls the operation of the display 516, as well as the overall operation of the mobile communication device 510, in response to actuation of keys on the keyboard 514 by the user.

The housing 512 may be elongated vertically, or may take on other sizes and shapes, including a clamshell housing structure, among other structures. The keyboard may include a mode selection key, or other hardware or software for switching between text entry and telephony entry.

In addition to the processing device 518, other parts of the mobile communication device 510 are shown schematically in FIG. 8. These include a communications subsystem 600; a short-range communications subsystem 602; the keyboard 514 and the display 516, along with other input/output devices 606, 608, 610, and 612; memory devices 616, 618; and various other device subsystems 620. The mobile communication device 510 is preferably a two-way RF communication device having voice and data communication capabilities. In addition, the mobile communication device 510 preferably has the capability to communicate with other computer systems via the Internet.

Operating system software executed by the processing device 518 is preferably stored in a persistent store, such as a flash memory 616, but may be stored in other types of memory devices, such as a read only memory (ROM) or similar storage element. In addition, system software, specific device applications, or parts thereof, may be temporarily loaded into a volatile store, such as a random access memory (RAM) 618. Communication signals received by the mobile communication device may also be stored to the RAM 618.

The processing device 518, in addition to its operating system functions, enables execution of software applications 630A-630N on the device 510. A predetermined set of applications that control basic device operations, such as data and voice communications 630A and 630B, may be installed on the device 510 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 640. Preferably, the PIM data items are seamlessly integrated, synchronized and updated via the wireless network 640 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and incorporated herein by reference.

Communication functions, including data and voice communications, are performed through the communication subsystem 600, and possibly through the short-range communications subsystem. The communication subsystem 600 includes a receiver 650, a transmitter 652, and one or more antennas 654, 656. In addition, the communication subsystem 600 also includes a processing module, such as a digital signal processor (DSP) 658, and local oscillators (LOs) 660. The specific design and implementation of the communication subsystem 600 is dependent upon the communication network in which the mobile communication device 510 is intended to operate. For example, a mobile communication device 510 may include a communication subsystem 600 designed to operate with the MOBITEX, DATATAC or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 510.

Network access requirements vary depending upon the type of communication system. For example, in the MOBITEX and DATATAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 510 may send and receive communication signals over the communication network 640. Signals received from the communication network 640 by the antenna 654 are routed to the receiver 650, which provides for signal amplification, frequency down conversion, filtering, channel selection, etc., and may also provide analog to digital conversion. Analog-to-digital conversion of the received signal allows the DSP 658 to perform more complex communication functions, such as demodulation and decoding. In a similar manner, signals to be transmitted to the network 640 are processed (e.g. modulated and encoded) by the DSP 658 and are then provided to the transmitter 652 for digital to analog conversion, frequency up conversion, filtering, amplification and transmission to the communication network 640 (or networks) via the antenna 656.

In addition to processing communication signals, the DSP 658 provides for control of the receiver 650 and the transmitter 652. For example, gains applied to communication signals in the receiver 650 and transmitter 652 may be adaptively controlled through automatic gain control algorithms implemented in the DSP 658.

In a data communication mode, a received signal, such as a text message or web page download, is processed by the communication subsystem 600 and is input to the processing device 518. The received signal is then further processed by the processing device 518 for an output to the display 516, or alternatively to some other auxiliary I/O device 606. A device user may also compose data items, such as e-mail messages, using the keyboard 514 and/or some other auxiliary I/O device 606, such as a touchpad, a rocker switch, a thumbwheel, or some other type of input device. The composed data items may then be transmitted over the communication network 640 via the communication subsystem 600.

In a voice communication mode, overall operation of the device is substantially similar to the data communication mode, except that received signals are output to a speaker 610, and signals for transmission are generated by a microphone 612. Alternative voice or audio I/O subsystems, such as a voice message recording subsystem, may also be implemented on the device 510. In addition, the display 516 may also be utilized in voice communication mode, for example to display the identity of a calling party, the duration of a voice call, or other voice call related information.

The short-range communications subsystem enables communication between the mobile communication device 510 and other proximate systems or devices, which need not necessarily be similar devices. For example, the short-range communications subsystem may include an infrared device and associated circuits and components, or a BLUETOOTH communication module to provide for communication with similarly-enabled systems and devices.

While various features of the claimed invention are presented above, it should be understood that the features may be used singly or in any combination thereof. For example, the circular touchpad 405 and rotatable rim 305 may be used in any of the example key arrangements or in other key arrangements encompassed by the claims. Another example variation is that there may be four or more defined surfaces on the multidirectional navigational input key in any of the examples listed above or in other embodiments. Yet another variation is that a telephony keypad layout may be integrated with the multidirectional navigational input key and other keys in any of the above examples or in other embodiments. Therefore, the claimed invention is not to be limited to only the specific embodiments depicted herein.

Further, it should be understood that variations and modifications may occur to those skilled in the art to which the claimed invention pertains. For example, the telephone pad numeric layout could be applied to any of the key arrangements described herein, instead of just the example of FIG. 1. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A key arrangement comprising:
a plurality of alphanumeric keys in an array that has a plurality of rows and a plurality of columns, the plurality of columns including a first column, a last column, and one or more middle columns; and
a multidirectional navigation input device located within at least two of the plurality of columns, said multidirectional input device moveable in a plurality of directions and having a plurality of areas of the multidirectional input device associated with each direction wherein the plurality of areas generally correspond with the rows and columns of the array, and wherein at least two of the plurality of the areas provide an alphanumeric function in a first mode and a navigation function in a second mode.

2. The key arrangement of claim 1, wherein the multidirectional navigational input device is in the one or more middle columns.

3. The key arrangement of claim 1, wherein the plurality of alphanumeric keys have alphanumeric indicia in one of the following layouts: QWERTY, reduced QWERTY, QWERTZ, DVORAK, or AZERTY.

4. The key arrangement of claim 1, wherein the alphanumeric indicia further includes a telephony keypad.

5. The key arrangement of claim 1, wherein at least four areas of the multidirectional navigational input device have alphanumeric indicia.

6. The key arrangement of claim 5, wherein the plurality of alphanumeric key shave alphanumeric indicia in one of the following layouts: a QWERTY, reduced QWERTY, QWERTZ, AZERTY, or DVORAK arrangement.

7. The key arrangement of claim 1, wherein the key arrangement further comprises a rotatable rim disposed about the multidirectional navigational input device.

8. The key arrangement of claim 1, wherein the key arrangement further comprises a touch pad disposed about the multidirectional navigational input device.

9. A mobile device comprising:
a housing;
a processor coupled to the housing;
a display coupled to the housing; and
a keyboard coupled to the housing;
the keyboard comprising a key arrangement, wherein the key arrangement comprises:
a plurality of alphanumeric keys in an array that has a plurality of rows and a plurality of columns, the plurality of columns including a first column, a last column, and one or more middle columns; and
a multidirectional navigation input device located within at least two of the plurality of columns, said multidirectional input device moveable in a plurality of directions and having a plurality of areas of the multidirectional input device associated with each direction wherein the plurality of areas generally correspond with the rows and columns of the array, and wherein at least two of the plurality of the areas provide an alphanumeric function in a first mode and a navigation function in a second mode.

10. The mobile device of claim 9, wherein the alphanumeric keys are integrated with the multidirectional navigational input device in one of a QWERTY, reduced QWERTY, QWERTZ, AZERTY, or DVORAK layout.

11. The mobile device of claim 9, wherein a first row of alphanumeric keys comprises at least five columns, the middle column being populated with an upper portion of the multidirectional navigational input device;
wherein a second row of alphanumeric keys comprises at least five columns, the outer columns being populated by alphanumeric keys, and the middle columns being populated by a middle portion of the multidirectional navigational input device; and
wherein a third row of alphanumeric keys comprises at least five columns, the middle column being populated by a lower portion of the multidirectional navigational input device.

12. The mobile device of claim 9, wherein the first row of alphanumeric keys is imprinted with the letters Q, W, E, R, T, Y, U, I, 0, P, the upper portion of the multidirectional navigational input device being imprinted with one or more of the letters R, T, Y, and U;

wherein the second row of alphanumeric keys is imprinted with the letters A, S, D, F, G, H, J, K, L, the center portion of the multidirectional navigational input device being imprinted with three or more of the letters S, D, F, G, H, J, and K; and the third row of alphanumeric keys is imprinted with the letters Z, X, C, V, B, N, and M, the bottom portion of the multidirectional navigational input device being imprinted with one or more of the letters C, V, B, and N.

13. The mobile device of claim 9, wherein in a first row of alphanumeric keys, the multidirectional navigational input device is situated in the middle of eight keys.

14. The mobile device of claim 13, wherein the multidirectional navigational input device has one side portion imprinted with the letters T, G, and V, and another side portion is imprinted with the letters Y, H, and B;

and each of the remaining eight keys in the first row are imprinted with the letters in a single column of a QWERTY key layout other than the two middle columns of the QWERTY key layout.

15. The mobile device of claim 9, wherein the multidirectional navigational input device is centered between eight or nine alphanumeric keys in three columns on one side and eight or nine alphanumeric keys in three columns on another side.

16. The mobile device of claim 15, wherein at least one of the letters F and G are imprinted on one side of the multidirectional navigational input device, and at least one of the letters H and J are imprinted on another side of the multidirectional navigational input device.

17. The mobile device of claim 9, wherein the multidirectional navigational input device is centered between at least two columns of alphanumeric keys on a left side and at least two columns of alphanumeric keys on a right side; wherein the columns on the left side are diagonally oriented so that the keys in each row are further to the left than the keys in lower rows in the same column, and the columns on the right side are diagonally oriented so that the keys in each row are further to the right than the keys in lower rows in the same column.

18. The mobile device of claim 17, wherein the multidirectional navigational input device is centered between six keys in a first row, four keys in a second row, and four keys in a third row.

19. The mobile device of claim 18, further comprising a fourth row, wherein a space bar key is centered between two columns of keys on the right and two columns of keys on the left.

20. The mobile device of claim 9, wherein a center surface of the multidirectional navigational input device has a select function.

21. The mobile device of claim 9, comprising at least twenty-two alphanumeric keys, wherein each of twenty-two keys and four areas of the multidirectional navigational input device are operable to enter a single letter of the alphabet.

22. The mobile device of claim 9, wherein the multi-directional navigation device of is in the one or more middle columns.

23. The mobile device of claim 9, wherein the alphanumeric keys have alphanumeric indicia in one of the following layouts: QWERTY, reduced QWERTY, QWERTZ, DVORAK, or AZERTY.

24. The mobile device of claim 23, wherein the alphanumeric indicia further includes a telephony keypad.

25. The mobile device of claim 24, wherein the numerals 2, 4, 5, 6, and 8 are printed respectively on an upper, left, center, right, and lower area of the multidirectional navigational input device.

26. The mobile device of claim 9, wherein at least four areas of the multidirectional navigational input device have alphanumeric indicia.

27. The mobile device of claim 9, wherein the key arrangement further comprises a rotatable rim disposed about the multidirectional navigational input device.

28. The mobile device of claim 9, wherein the key arrangement further comprises a touch pad disposed about the multidirectional navigational input device.

* * * * *